Sept. 4, 1962   F. A. NACHMAN, JR   3,052,460
COIL SPRING ASSEMBLY AND COMPONENTS THEREOF
Filed Feb. 10, 1958   2 Sheets-Sheet 2

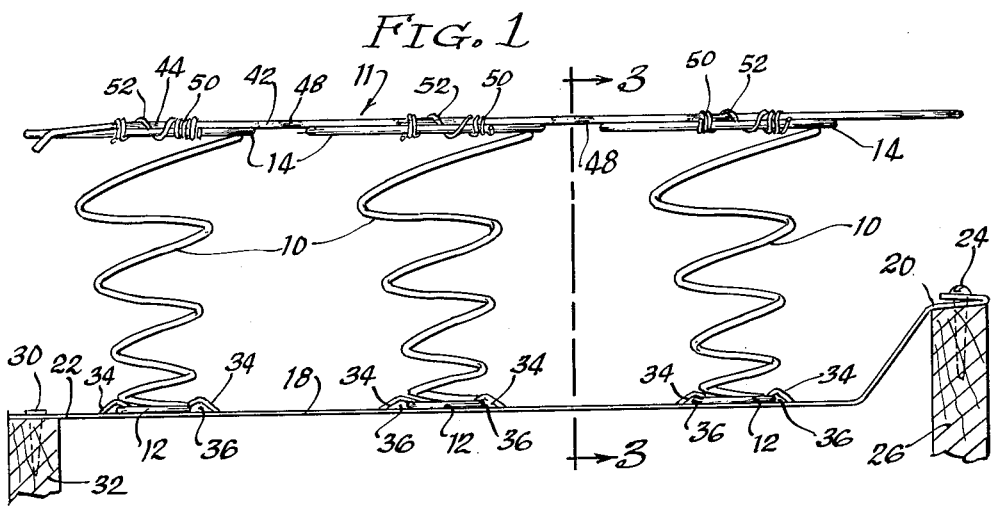
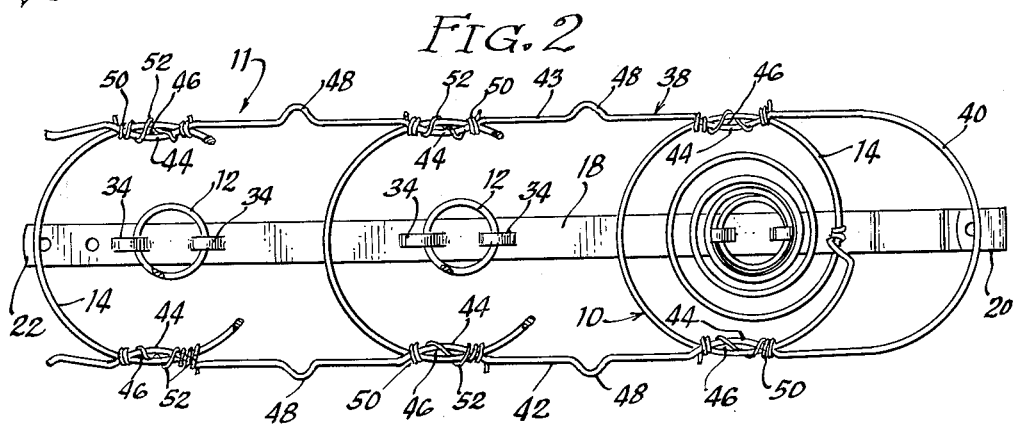
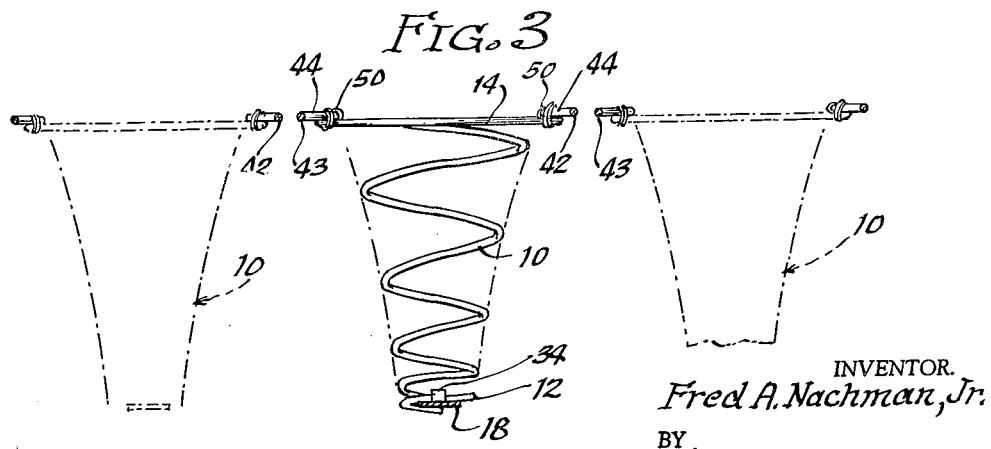

INVENTOR.
Fred A. Nachman, Jr.
BY
Ooms, McDougall, Williams & Hersh
Attorneys

United States Patent Office 3,052,460
Patented Sept. 4, 1962

3,052,460
COIL SPRING ASSEMBLY AND COMPONENTS THEREOF
Fred A. Nachman, Jr., Chicago, Ill., assignor to Nachman Corporation, Chicago, Ill., a corporation of Illinois
Filed Feb. 10, 1958, Ser. No. 714,183
2 Claims. (Cl. 267—100)

This invention relates to spring assemblies for use in fabrication of upholstered furniture and the like comprising in part a plurality of prefabricated spring coil units designed to impart resiliency and seating comfort to the upholstery.

An object of this invention is to provide a spring assembly for the use in manufacture of upholstered furniture.

It is another object to provide in the spring assembly a plurality of spring units which may be prefabricated, which have a high degree of resiliency and flexibility in practically all directions, which can be assembled in different combinations to produce a spring assembly of various dimensions for the use in the manufacture of upholstered furniture and which are provided with novel means for lateral connection and mutual lateral support with a resultant high degree of durability and which are so constructed to achieve a high degree of structural stability.

This application is addressed to an improvement in the spring assembly described in the Nachman, Jr. et al. Patent No. 2,764,226 and in the spring assembly which is further described in the copending application Serial No. 714,832 filed February 12, 1958 and entitled Adjustable Coil Spring Unit and Assembly, now abandoned, all of which are owned by a common assignee. In the aforementioned patent and patent application, description is made of a spring unit used to form a spring assembly wherein the unit is formed of a plurality of coil springs secured at their lower ends in longitudinally spaced-apart relation onto a common base member. The spring coils are secured at their upper ends to a common border wire which extends alongside the latter edges of the upper coils of the coil springs attachment being effected as by means of a helical tie wire.

Each set of coil springs so connected comprises an individual spring unit which may be dimensioned to any predetermined length.

A plurality of the aforesaid spring units may be assembled in laterally spaced-apart relation between frame members of an upholstered piece of furniture, of predetermined size, the number of spring units to be used depending upon the size of the upholstered piece and the concentration of springs desired for support. The spring units are shown in the aforesaid patent and patent application as being laterally connected by small coil springs for mutual support.

As an improvement of the aforesaid patent, this invention discloses novel means for securing the uppermost coil of the coil springs to the border wire in such a manner as to limit or eliminate any possibility of relative endwise movement between the coil springs and the border wire. This invention also includes a novel configuration in the border wire by which the helical spring ties or other means for interconnecting the border wires of adjacent units within a spring assembly may be held fixedly in place and restrained against inadvertent sidewise or endwise movement and consequent displacement from their desired predetermined position effected in the original assembly. The result of these improvements is a new and improved combination of elements for a spring assembly which provides for greater stability and support under operating conditions.

The aforementioned objects and advantages of this invention will hereinafter appear and for the purposes of illustrating one embodiment of the invention, but not limiting the claims, drawings are appended, of which:

FIG. 1 is a side elevational view of a coil spring unit embodying features of this invention;

FIG. 2 is a top plan view of the spring unit shown in FIG. 1;

FIG. 3 is an elevational side view of one of the helical springs in the unit taken along the line 3—3 in FIG. 1 and showing in broken lines like adjacent springs in similar spring units to the left and right.

Figure 4:
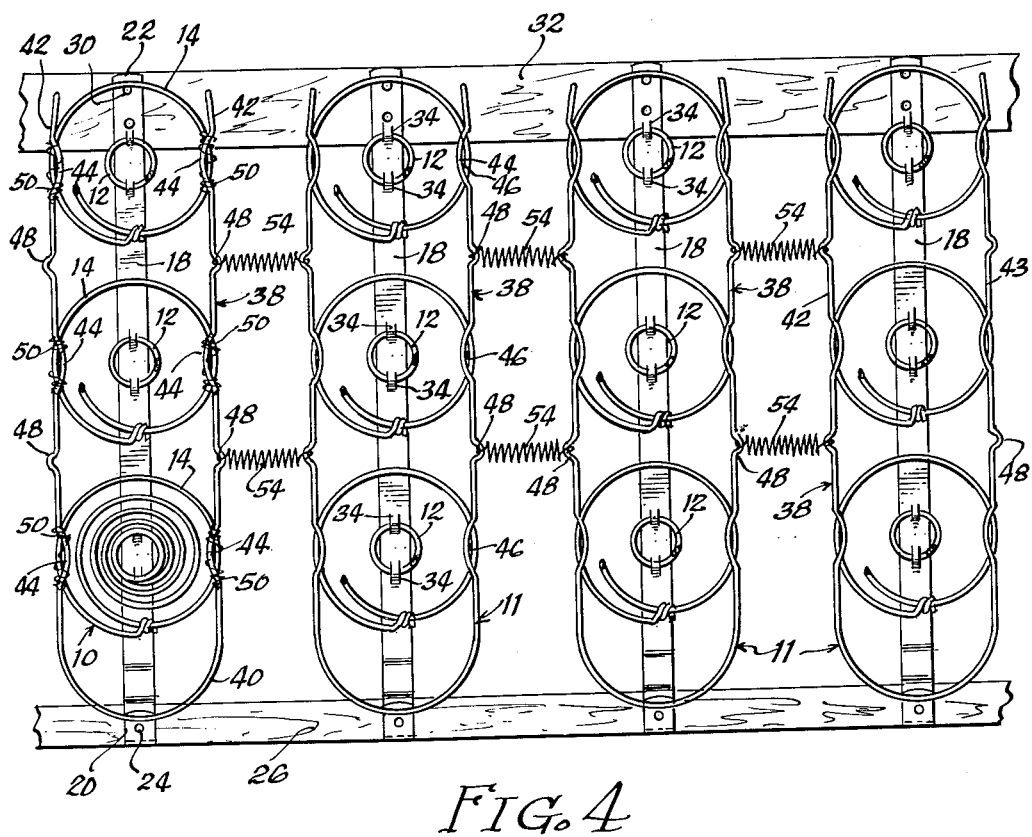
FIG. 4 is a top plan view of a portion of a spring assembly embodying the individual spring unit in an assembled relation.

Turning now to the figures, the embodiment shown in FIG. 1 comprises a plurality of helical coil springs 10, which are longitudinally arranged, preferably in equally spaced-apart relation. While the particular embodiment shown in FIG. 1 contains three such helical springs 10, it will be understood that any number of such springs 10 may be used according to the length of the prefabricated unit desired.

The helical coil springs 10 are secured, as by the various means taught in the aforementioned patent and patent application, to a support or base member, as represented by the elongate bar 18. The bar 18 may be in the form of a flat, resilient, strap member, as shown in the embodiment in FIG. 1, and in the alternative it may be of any other suitable shape so long as it has the property of relative rigidity and flexibility and is of sufficient gauge and dimensions to support the connected coil springs 10 and the other elements of the assembled upholstered piece. For such purpose, the strap member may be formed of a spring metal, wood, plastics, glass fiber, reinforced laminate, or the like. The supporting means 18 extends lengthwise beyond the ends of the end coils 10 and is provided at its extreme end portions 20 and 22 with means, such as openings for the insertions of nails, screws 24 and 30, or other fastening means to enable the assembled spring unit 11 to be attached to frame members 26 and 32.

For attachment between the strap members and the lowermost coils of the coil springs, the supporting means 18 is provided at spaced-apart intervals along its lengthwise dimension with pairs of upstruck portions 34, presenting openings 36 therein to receive a portion of the lowermost coil 12 of the coil spring. The distance between the openings 36 in each pair of upstruck portions is substantially equal to the diameter of the lowermost coil 12 and the distance between each respective pair of upstruck portions is calculated to correspond to the distance between the coil springs 10.

The border wire 38 comprises an elongated, continuous, substantially rigid but flexible member, which may be manufactured of metal, plastic, or the like, having generally straight lengthwise or arm portions 42 and 43 extending along the outer margins of the uppermost coils 14 of the springs 10 and curvilinear end portions 40 beyond the coil springs 10.

At spaced-apart intervals along its generally straight portions 42 and 43, corresponding to the spaced relation between the coil springs, the border wire 38 is provided with a plurality of continuous inwardly offset portions 44. These inwardly flaring portions 44 are positioned to coincide generally with the points at which the border wire 38 is tangent to the coils 14.

Thus, the inwardly flaring portion 44 of the border wire 38 lap the adjacent edge portions of the terminal coils 14 of the coil springs 10, defining between them an opening 46 through which a tie wire 50 is inserted for securing the border wire 28 to the uppermost coil 14. The tie wires 50 employed to secure the uppermost coils 14 to the border wire 38 at the reentrant portions 44 thereof are entwined in their extreme portions around the border wire 38 and the uppermost coils 14 at their spaced overlapping portions, thus securing them together in a fixed position to prevent relative endwise movement of the border wire relative to the coils 14. Between the ends, a medial portion of the tie wire 50 extends through the opening 46, thus restraining relative sidewise movement between the border wire 38 and the terminal coils 14.

The border wire 38 is also provided at spaced intervals throughout its generally straight intermediate portions 42 and 43 with continuous protuberant portions 48 flaring outwardly in a direction opposite to the direction of the flare of the reentrant or inwardly flaring portions 44. In the preferred embodiment shown in the drawings, the protuberances 48 are spaced at uniform distances from the reentrant portions 44, and preferably approximately equidistantly therebetween.

When a plurality of prefabricated spring units 11, comprising the supporting means 18, the helical springs 10, the border wire 38 and the tie wires 50, are assembled in the desired number in a piece of upholstery of predetermined size as shown in FIG. 4, the prefabricated units 11 are arranged in parallel spaced-apart relation between the frame members 26 and 32 and secured thereto as described. In the assembly shown in FIG. 4, the spring units are resiliently interconnected throughout their lengths by helical connecting coil springs 54 secured at their opposite ends to the outwardly projecting portions 48 of adjacent tie wires 38 of adjacent spring units. When the helical coils 54 are installed under tension to interconnect a plurality of spring units 11 in assembled relation, the effect of the connection of the helicals 54 to the protuberant portions 48 prevents the helicals 54 from sliding at their ends along the border wire 38, thus providing a more stable assembly.

It will be readily perceived that load imposed on the coil spring 10 of one unit 11 will transmit the load to one or more adjacent coil springs 10 in the same unit 11 through the border wire 38 or to adjacent units through the helicals 54, thus effecting a desirable distribution of load and affording support to that coil spring bearing the heaviest load.

Because of the structural features of this invention, certain advantages are achieved which may be summarized. Spring units 11, comprising the supporting means 18, the springs 10, and tie wires 50, may be prefabricated and installed in the number needed in upholstered pieces of predetermined size. The tie wire 50, by its medial portion 52 between the border wire 38 and the coil 14 restrains relative movement therebetween and contributes to a stable assembly.

As previously discussed, the protuberances 48 prevents sidewise sliding of the ends of the helicals 54. Moreover, the helicals 54 and the border wires 38 achieve a desirable distribution of load.

Prefabrication of the units 11 will enable the manufacturer to install the units in upholstery of predetermined size and to preassemble the spring units 11 separate for assembly of the final upholstered piece if desired.

Having disclosed one specific embodiment of my invention, I intend to claim it and all equivalents thereto.

Wherefore, I claim:

1. A spring unit for use in upholstered furniture comprising an elongate base member of a relatively rigid but resilient material, a plurality of coil springs arranged in longitudinally spaced-apart relation on the base member with the outermost springs spaced inwardly from the end of the base member, means interconnecting the lowermost coils in the coil springs with the base member, parallel border wires extending lengthwise and in parallel relation with the base member alongside the opposite lateral edges of the top coils of the coil springs, said border wires being inwardly offset in the portions alongside the terminal coils of the coil springs to extend inwardly beyond said coils to provide an overlap between the border wires and the spring coils in longitudinally spaced apart portions with an opening between said elements in the area between said overlaps, and said border wire also being offset outwardly in portions of its lengths intermediate the spring coils for receiving a means for interconnecting the border wires of adjacent spring units in a crosswise direction, tie wire means having the end wrapped about the overlapping portions of the terminal coils and the border wires with an intermediate portion of the tie wires extending through said opening therebetween to intertie the border wires and the spring coils and prevent relative displacement, and with the inward and outward offsets of said parallel border wires being oppositely opposed.

2. A spring assembly for use as a support for upholstery and the like comprising a frame member having at least two oppositely disposed sides and a plurality of unitary spring units, in spaced-apart parallel relation, each of said units comprising an elongate supporting member connected to said oppositely disposed side members of said frame and dimensioned to have a length sufficient to extend therebetween; a plurality of coil springs aligned in spaced-apart parallel relation, said supporting member extending transversely to the lower ends of said coil springs in abutting relation, means connecting each of the lower terminal coils of said coil springs to said supporting means at spaced-apart points and parallel border wires extending along the outer edges of the upper terminal coils of said coil springs, said parallel border wires being provided a plurality of oppositely opposed spaced-apart continuous inwardly flaring portions, each of said inwardly flaring portions extending transversely at two points to each of the said upper terminal coils to define between said inwardly flaring portion and said upper terminal coils an open space, a tie wire having two end portions and an intermediate portion, said end portions embracing said upper terminal coil and said border wire at spaced-apart points and said intermediate portion extending through said opening to restrain relative sidewise movement between said border wires and said upper terminal coil, said border wires also being offset outwardly in longitudinally spaced-apart portions intermediate the spring coils, and resilient means extending crosswise between adjacent spring units and having the opposite ends anchored to the outwardly offset portions of the adjacent border wires of adjacent units resiliently to interconnect the units in a crosswise direction.

References Cited in the file of this patent

UNITED STATES PATENTS

| 814,244 | Smith | Feb. 20, 1906 |
| 2,015,927 | Gilmore | Oct. 1, 1935 |
| 2,050,105 | Lewis | Aug. 4, 1936 |
| 2,102,066 | Gleason | Dec. 14, 1937 |
| 2,105,115 | Gleason | Jan. 11, 1938 |
| 2,764,226 | Nachman et al. | Sept. 25, 1956 |

FOREIGN PATENTS

| 539,770 | Great Britain | Sept. 23, 1941 |